United States Patent [19]

Kramer

[11] 4,174,767
[45] Nov. 20, 1979

[54] AIR-LINE LUBRICATORS AND THE LIKE

[75] Inventor: Petrus H. Kramer, Krugersdorp, South Africa

[73] Assignee: West Rand Engineering Works (Proprietary) Limited, Transvaal, South Africa

[21] Appl. No.: 740,359

[22] Filed: Nov. 10, 1976

[30] Foreign Application Priority Data

Nov. 13, 1975 [ZA] South Africa ............... 75/7139

[51] Int. Cl.² ........................................... F16N 7/32
[52] U.S. Cl. ...................................... 184/55 A; 184/39
[58] Field of Search .............. 184/6.26, 29, 39, 54, 184/55 R, 55 A, 57-59

[56] References Cited

U.S. PATENT DOCUMENTS

| | | | |
|---|---|---|---|
| 1,493,049 | 5/1924 | Mitchell | 184/39 UX |
| 1,984,422 | 12/1934 | Nell | 184/55 A |
| 2,105,490 | 1/1938 | Noble | 184/55 A |
| 2,235,897 | 3/1941 | Moore | 184/39 UX |
| 2,731,297 | 1/1956 | Meyer | 184/39 UX |
| 2,897,919 | 8/1959 | Dellner | 184/55 A |
| 2,982,376 | 5/1961 | Lincoln | 184/55 A |
| 3,261,426 | 7/1966 | Kuhlman | 184/55 A |
| 3,463,270 | 8/1969 | Lundstrom et al. | 184/39 |

FOREIGN PATENT DOCUMENTS

| | | | |
|---|---|---|---|
| 991564 | 6/1976 | Canada | 184/54 |
| 1058476 | 6/1952 | France | 184/55 A |

Primary Examiner—David H. Brown
Attorney, Agent, or Firm—Peter L. Berger

[57] ABSTRACT

The invention provides for a cartridge for lubricant which is designed for use in an air line lubricator. The cartridge comprises a rigid sleeve defining an outlet nozzle for lubricant at its one end, with the other end being open and directed in use into the stream of pressure air flowing through the lubricator. A flexible sock with its mouth region secured within the sleeve acts physically to separate lubricant in the sleeve from the pressurized air, the body length of the sock being sufficient to permit exhaustion of lubricant from the sleeve. The sock may be secured within the sleeve at the outlet end thereof, midway there-along, or at its open end. In the latter case a method of charging the sleeve in accordance with a further aspect of the invention comprises locating a second sleeve within the cartridge sleeve so that during the charging process the sock is folded back on itself through the action of the secondary sleeve. After charging the secondary sleeve is withdrawn.

5 Claims, 4 Drawing Figures

AIR-LINE LUBRICATORS AND THE LIKE

This invention relates to air line lubricators and the like.

An air line lubricator is a device which is inserted in a pressure air line to a device such as a rock drill. The pressurized air operates the drill and in flowing through the lubricator it picks up particles of lubricating material such as grease and carries these particles into the machine. In modern forms of lubricators the pressurized air actually acts to actuate means within the lubricator for urging the grease into the air path to the machine.

Thus in one known air line lubricator the grease is accommodated in the container which is inserted in a bore therefor in the lubricator body. The leading end of the container includes an aperture through which grease escapes from the container while the rear of the container is closed by a closure member operable as a piston. Pressurized air enters the container, impinges against the piston to drive it forwardly into the container cavity where the grease is located, simultaneously is allowed to pass around the body of the container towards the outlet from the lubricator, and in the zone of the outlet acts to entrain particles of lubricant so that the lubricant is carried forward in the air stream to the machine in question.

In another known form of lubricator the grease is located in a collapsible bag and the pressurized air forces the grease out of the bag and into the air stream.

Variations on the collapsible bag arrangement are known.

An object of the present invention is largely the provision of an improvement on the piston-type arrangement which the applicant believes will have useful advantages.

It is to be understood that the concept of the invention is directed generally to those appliances which are used for purposes of dosing a fluid stream with lubricant and this extension is envisaged in the reference earlier to 'air line lubricators and the like'.

According to the present invention a container for lubricant adapted for insertion in a lubricator of the kind referred to includes a relatively rigid sleeve for a charge of lubricant such as grease, the sleeve being closed at an outlet end thereof and the outlet providing an aperture through which the lubricant may escape en route from the lubricator, an open rear end to the sleeve through which pressurized fluid may engage the lubricant charge to expel lubricant from the aperture, and a flexible sock anchored within the sleeve which acts physically to separate the lubricant from the pressurized fluid and which has a body length sufficient to permit substantial exhaustion of the charge from the sleeve.

Further according to the invention the sock mouth is anchored at or adjacent the open rear end of the sleeve and is doubled over or folded internally so that the toe of the sock which is engaged by the pressure fluid projects rearwardly towards the open end of the sleeve.

In an alternative form of the invention the sock has its mouth anchored within the body of the sleeve and its closed toe end projects back to the open end of the sleeve.

A further form of the invention is one in which the sock mouth is anchored close to the leading end of the container and projects rearwardly so that its closed end is located near the open end of the sleeve when the sock is fully extended.

The sock is preferably formed from a substantially air impervious flexible synthetic resinous material.

The invention is also directed to a method of filling a container in accordance with the invention, the method including the steps of providing a container in which the flexible sock is anchored near the rear open end of the sleeve and is adapted to be folded over within the container, inserting into the container sleeve and sock a secondary sleeve which neatly telescopes therein, and injecting lubricant through the aperture in the fore or leading end of the container sleeve thereby to urge the leading sock portion rearwardly into the secondary sleeve in the process of filling the container, and finally withdrawing the secondary sleeve. Normally the secondary sleeve will be entered into the sock to an extent substantially equal to half the unfolded length of the sock.

It is further intended to include within the scope of the invention an air line lubricator comprising a housing having an inlet thereto and an outlet therefrom both adapted to be coupled into an air pressure line, and passageway through the housing coupling the inlet and the outlet, a container for lubricant substantially as disclosed herein housed within the passageway and disposed such that air entering the inlet impinges on the container sock to expel lubricant from the container outlet and thereafter flows past the container to the lubricant outlet, entraining expelled lubricant en route from the lubricator outlet.

Preferably the housing is capable of being opened to provide access to the container for replacement purposes.

To illustrate the invention some examples are described hereunder with reference to the accompanying drawings in which.

Figure 1:
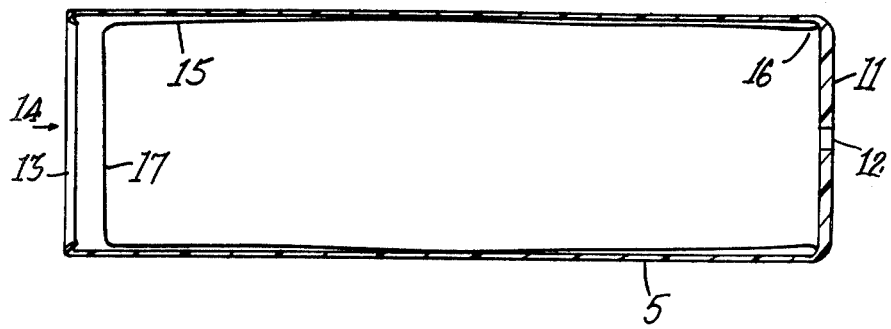
FIG. 1 is a diagrammatic cross-sectional elevation of one form of container in accordance with the invention.
Figure 2:
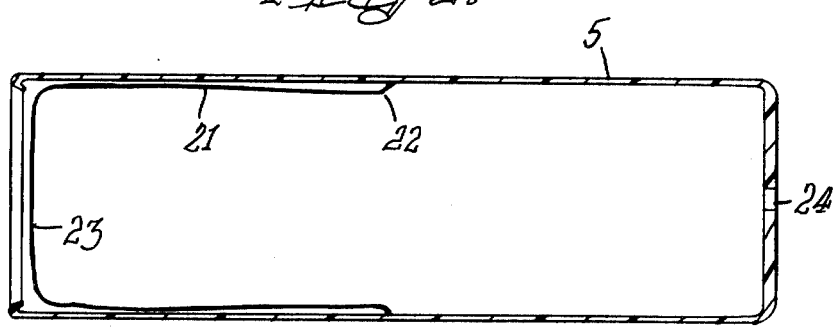
FIG. 2 is a similar view of a second form of container.
Figure 3:
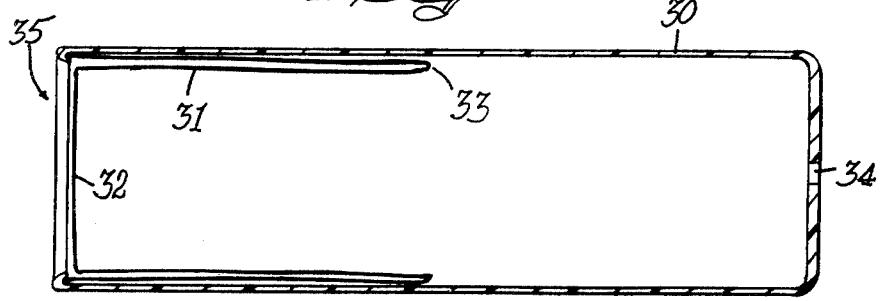
FIG. 3 is a similar view of a third form of container.
Figure 4:
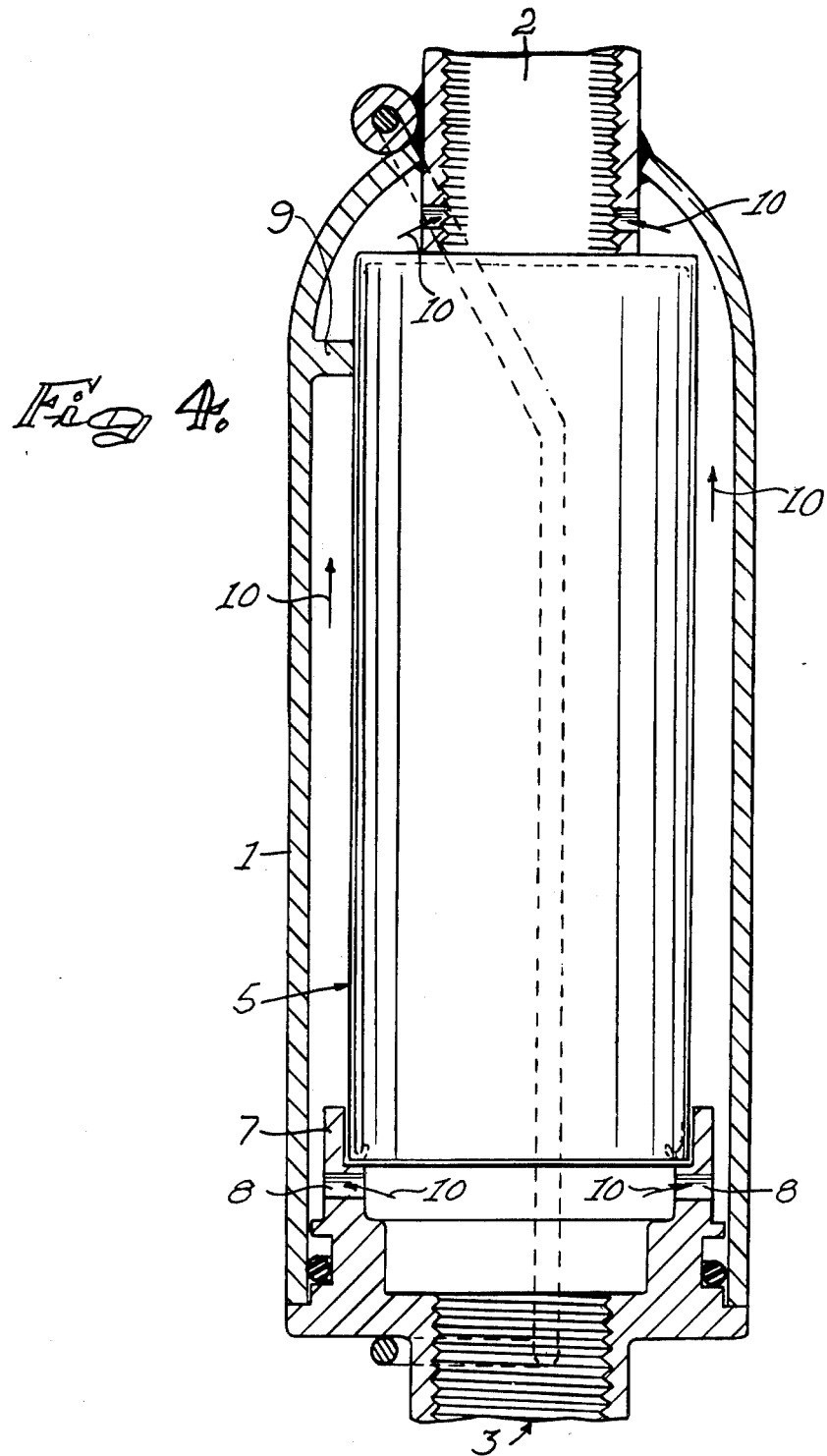
FIG. 4 is a diagrammatic cross-sectional elevation of a lubricator with a container in accordance with the invention housed therein.

The sleeves shown in FIGS. 1 to 3 of the accompanying drawings are intended for insertion in air line lubricators of the kind illustrated in FIG. 4.

The lubricator in FIG. 4 provides a tubular housing 1 having an inlet 3 thereto and outlet 2 therefrom. The inlet 3 is in the nature of a removable spigot providing access to the interior of the housing 1. A container 5 for lubricant, which is more fully described hereinafter, is axially disposed within the housing 1 in use, the container 5 being spaced from the inner side walls of the housing 1. Inwardly projecting lugs 9 and a socket formation 7 serve to hold the container in the desired position.

In use air flows through the inlet 3 and impinges on the rear end of the container 5 and thereafter flows to the outlet 2 via a pathway indicated by the arrows 10 through passageway 8. Air impinging on the rear of the container 5 acts to expel lubricant from a remote container outlet, the expelled lubricant being entrained by the air flow through the outlet 2.

The description of the lubricator above will serve to illustrate the general type of lubricator which may be employed with the container 5 of the invention. Kinetic energy of the air stream, as well as a pressure differential between the inlet 3 and outlet 2 resulting from the constricted air path between these, are utilized for expelling lubricant from the container 5. Clearly kinetic energy only, or potential energy only may be used to operate the lubricator.

Referring to FIG. 1 of the accompanying drawings, the grease cartridge is made up of a container 5 which is in the form of a sleeve made of a material such as a suitable synthetic resinous material. The container 5 is closed at its leading end 11 but is apertured at 12 to permit lubricant such as grease to pass out of the lubricator, and its rear end 13 is open. Incoming pressure air strikes the rear of the container 5 in the process of urging lubricant out of the container, arrows 14 indicating the direction of movement of such pressure air.

Within the cavity of container 5 there is a sock 15 of thin plastic material, the sock being anchored at its mouth end 16 near or at the end 11 of the container 5 and trailing rearwardly to terminate in a closed toe end 17 which substantially covers the whole internal cross-section of the container cavity. The sock is filled with grease and pressurized air impinging against the end 17 of the sock acts to expel grease through the aperture 12 en route out of the lubricator in the pressurized air stream flowing therefrom.

The use of the sock effectively eliminates the need for the piston arrangement or the like commonly found in known lubricator reservoirs.

FIG. 2 shows a modification of the FIG. 1 arrangement. In this case container 5 is fitted with a sock 21 which has its mouth zone 22 anchored substantially mid-way along the bore of the container. Again the rear end 23 of the sock is directed to the force of the pressurized air and lubricant is thereby expelled through escape orifice 24 as the sock is moved into the bore of the container.

The third embodiment shown in FIG. 3 has a sock 31 which is doubled over in the container 30 and the rear end 32 of the sock is pushed forwardly by the pressurized air in the course of expelling lubricant from the container interior. In all embodiments it will be seen that the back end of the container is open to permit the pressurized air to perform its expelling function.

In order to fill container 30 with grease a secondary sleeve is telescoped into the bore of container 30 to the point where the fold over 33 is required. Lubricant is then urged into the container through orifice or aperture 34 and the incoming grease progressively forces the end 32 of the sock 31 rearwardly until it reaches the open rear or back end 35 of the container 30. The secondary or loading sleeve may then be withdrawn.

Many more examples of the invention exist each differing from the other in matters of detail only. The essence of the invention resides in the provision of a novel grease cartridge which may be re-used.

I claim:

1. A removable refillable container holding lubricant for use in an air-line lubricator employing pressurized fluid, said refillable container comprising a relatively rigid sleeve having a closure at one end thereof and an aperture through said end forming a passage through which the lubricant can pass out of or into said container, said sleeve having an open rear end, a flexible sock having a mouth portion anchored to the side of said sleeve forming an expandable chamber for holding said lubricant, and a toe extending toward said open end of said sleeve, said flexible sock separating said chamber from said pressurized fluid while urging said lubricant out of said chamber through said aperture, said sock having a body length sufficient to permit substantial exhaustion of the lubricant from the sleeve, said aperture and said flexible sock cooperating to receive lubricant to refill said chamber to form a newly charged grease containing chamber to be reused in said lubricator.

2. The container according to claim 1, wherein the sock mouth is anchored adjacent the open rear end of the sleeve and is folded internally, so that the toe of the sock which is engaged by the pressurized fluid projects rearwardly towards the open end of the sleeve.

3. The container according to claim 1 wherein the sock is formed from a substantially air impervious, flexible, synthetic resinous material.

4. The container according to claim 1, wherein the sock mouth is anchored close to the closure end of said sleeve.

5. The container according to claim 1, wherein the sock mouth is anchored at a point spaced from the closure end of said sleeve.

* * * * *